April 12, 1932.  C. J. BRISTOW  1,853,297
TUMBLING BARREL
Filed May 2, 1930
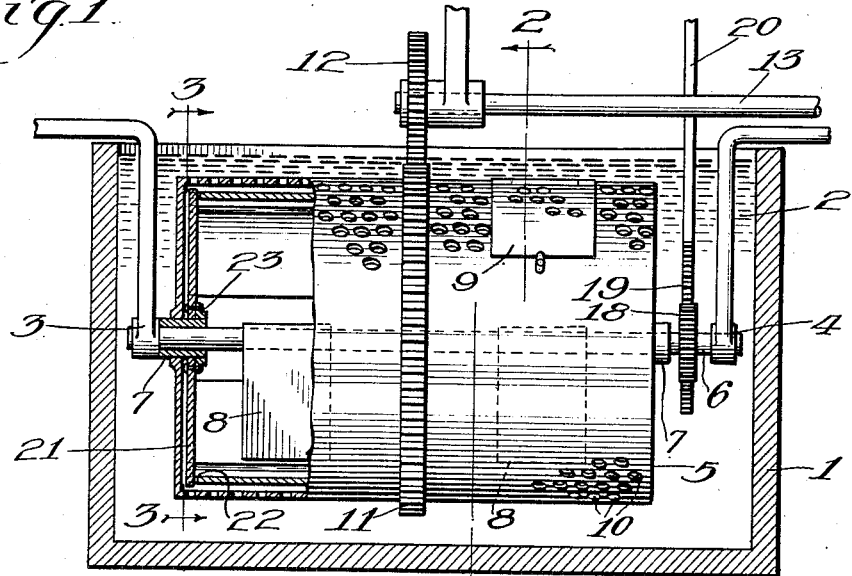
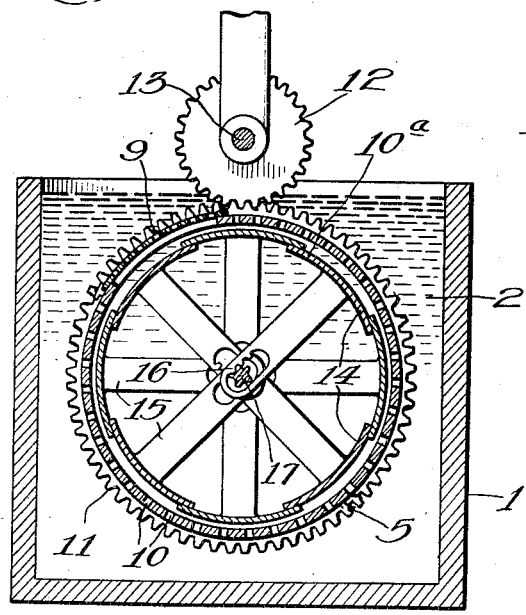
Inventor:
Clyde J. Bristow,
By Wallace R. Lane
Atty.

Patented Apr. 12, 1932

1,853,297

UNITED STATES PATENT OFFICE

CLYDE J. BRISTOW, OF CHICAGO HEIGHTS, ILLINOIS, ASSIGNOR TO ZOURI DRAWN METALS COMPANY, OF CHICAGO HEIGHTS, ILLINOIS, A CORPORATION OF ILLINOIS

TUMBLING BARREL

Application filed May 2, 1930. Serial No. 449,110.

The present invention relates to tumbling barrels, and more in particular to a novel construction of tumbling barrels adapted for use in chromium plating articles.

Among the objects of the present invention are to provide a tumbling barrel for use in chromium plating articles such as screws, bolts, nuts and other relatively small objects which by the present methods are extremely difficult to plate. The method now most prevalent in use in chromium plating such small objects, is to wire a plurality of them together, this wire providing one terminal of a source of current supply. By this prior method, it is next to impossible to efficiently and properly plate or coat the objects since it is extremely difficult to secure a good contact therewith after a relatively small amount of the chromium is precipitated on the article, the chromium being an extremely poor conductor. Also by this prior method, certain portions, as for instance those underlying the wire, are necessarily left unplated. Another serious disadvantage to the prior method is the slowness and tediousness encountered in plating these articles.

Another object of my invention is to provide a tumbling barrel in which there is a direct and positive contact of the current or terminal with the objects or articles to be plated. The present invention comprehends the use of expanding means in the barrel whereby such articles are impinged or impressed against the inner surface of the barrel which forms one of the electrodes, thus providing a good contact therebetween.

A further object of the invention is to provide a novel means and mechanism for operating the expanding mechanism so that the same may be alternately expanded and contracted, such alternate movements and the rotation of the barrel permitting the objects being plated to change their relative positions in order that they may be thoroughly plated.

Another object of the invention is the provision of a novel construction of electrical terminals or electrodes for carrying the current. Although the invention comprehends the use of terminals or electrodes of any construction or composition which the solution will not attack, it has been found that best results are produced by making the negative terminal or cathode of silver, either solid or plated.

A still further object is to provide a novel drive mechanism for the barrel and also for the shaft thereof, the barrel being rotated in but one direction, while the direction of the shaft is reversed at intervals so as to reciprocate the drive mechanism for the expanding device.

Further objects are to provide a construction of maximum simplicity, efficiency, economy and ease of assembly, adjustment and detachment, and such further objects, advantages and capabilities as will later more fully appear and are inherently possessed thereby.

The invention further resides in the combination, construction and arrangements of parts illustrated in the accompanying drawings, and while I have shown therein a preferred embodiment, it is to be understood that the same is susceptible of modification and change, and comprehends other details, arrangements of parts, features and constructions, without departing from the spirit of my invention.

Referring to the drawings:

Fig. 1 is a view, part in side elevation and part in cross section, of the tumbler and the mechanism for driving the same in the liquid container.

Fig. 2 is a view in vertical cross section taken in the planes represented by the line 2—2, and in the direction of the arrows.

Fig. 3 is a view in vertical cross section taken in the plane represented by the line 3—3.

Fig. 4 is a view in perspective of an electrode mounted on the shaft.

Referring more particularly to the drawings, the embodiment selected to illustrate the invention is shown as comprising a tank or container 1, constructed of crockery, glass, or of any other composition, material or metal which will not be attacked by the acid or other ingredients in the chromium solution 2 in the tank.

Mounted within this tank by means of suspended bearing members 3 and 4, is a tumbling barrel or container 5 provided with a shaft 6 fitting in and held by the bearings 3 and 4. This barrel or container is preferably constructed of silver, either solid or plated, although the same may be constructed of copper or lead, or of any material which is a good, electrical conductor. This barrel is connected by any suitable means (not shown) to the negative side of a source of current supply. The shaft 6 is preferably constructed of copper, although it also may be constructed of any other material which is an efficient electrical conductor. This shaft forms the anode and is suitably connected by means (not shown) to the positive side of an electrical supply. A suitable insulating bushing 7 is provided at each end of the barrel for insulating the same from the shaft.

Mounted on the shaft 6 is provided an anode 8 constructed of lead or other suitable conducting material. This anode may be constructed in one piece, or it may comprise a plurality of sections, each of which is provided at its upper edge with a hook portion which permits the anode to remain vertical as the shaft rotates, and further permits the ready attachment or detachment thereof. In order to place the anode and the article to be plated in the tumbling barrel 5, the same is provided with a cover or door 9. Whenever the anode is made in but one piece, and is too large to be inserted through this cover or closure, the barrel may be constructed with an end wall that is detachable.

In order that the chromium solution may have ready access to the interior of the tumbler and the enclosed articles or objects, the same is provided with openings 10 throughout its circumference. These openings, although being smaller than the screws, bolts or other articles that are being plated, are sufficiently large to allow the solution to flow therethrough.

A gear 11 encompasses the circumference of the tumbling barrel or container 1, and meshes with a gear 12 on a drive shaft 13. The gear 11 is of considerably greater diameter than the gear 12 in order that the tumbling barrel may be rotated slowly, thus permitting the articles that are being plated, to slowly turn over and change their position. This speed of rotation normally ranges between four to six revolutions per minute although such speed of rotation may be varied.

In order that the screws, bolts or other objects that are being plated may be forced into contacting engagement with the inside of the barrel or cathode, means are provided in this barrel for causing a periodic engagement of said articles with the inner circumference of the barrel or container. This means comprises a plurality of arcuate plates or sections 14 placed in overlapping engagement, and each provided with an arm 15 having an inner rack 16 adapted to mesh with teeth 17 on the shaft 6. Thus, as the shaft 6 is rotated in one direction, the arcuate plates 14 will be forced outwardly toward the inner circumference of the barrel, and when rotated in the opposite direction, these plates will be contracted or drawn toward the center of the barrel.

In order to provide for such reciprocating movement, the shaft 6 is provided with a gear 18 meshing with a rack 19 on an arm 20, this arm being adapted to be raised or lowered by any suitable means and at any suitable intervals, as desired.

In order to prevent the arcuate plates or sections 14 from shifting, arm members 21 are provided adjacent each end of the barrel. These arm members seat in openings 22 in the ends of the plate 14, the arms being mounted upon the bearing members 7, as at 23. As shown in Fig. 2, the supporting members 15 of the arcuate sections 14 are located centrally of the barrel, although it is to be understood that these members may be provided adjacent the ends of the barrel, if so desired.

By reason of the expansion means, the articles to be plated are positively forced against the barrel or negative terminals of the electric circuit. This provides a perfect contact between the articles to be plated, and the cathode or negative terminal. When the arcuate sections or expanding plates 14 are contracted, the articles being plated are permitted to shift their position by reason of the force which held them against the barrel being removed, and also by reason of the fact that the barrel is slowly rotated. In view of the alternate contraction and expansion of the plates 20, the articles being plated are periodically forced into engagement with the cathodes, and the solution which passes through the openings 10 in the barrel and 10$^a$ in the plates, precipitates the chromium or chrome on these articles and assures them a uniform coating throughout their extent.

From the above description and the disclosure in the drawings, it will be readily and clearly seen that I have provided a simple and efficient construction of tumbling barrels and apparatus for chromium plating articles such as screws, bolts or other small objects. Although I have shown but a single means for forcing these objects into engagement with the barrel, it will be readily appreciated that numerous means and mechanism may be provided for carrying out such step. For example, a rubber diaphragm operated by means of compressed air and alternately exhausted, may be used for supplying the force for impinging the articles against the barrel. Any well known chormium solution may be employed in the tank 1, and whenever it is desired to provide a brighter finish to the plated objects, any well known sulphate may be added to the solution.

Having thus disclosed my invention, I claim:

1. A tumbling barrel for use in chromium plating articles, comprising a member forming one terminal of an electrical circuit, and adapted to contain the articles to be plated, a shaft for said member forming the other terminal, and means on said shaft for causing contacting engagement of said articles with said member.

2. A tumbling barrel for use in chromium plating articles, comprising a member forming one terminal of an electrical circuit, and adapted to contain the articles to be plated, a shaft for said member forming the other terminal, an electrode mounted on said shaft, and means on said shaft for causing contacting engagement of said articles with said member.

3. A mechanism for use in chromium plating articles, comprising a container adapted to be immersed in a chromium solution and forming one terminal of an electrical circuit, a shaft in said container and insulated therefrom, said shaft providing the other terminal of said circuit, expanding mechanism carried by and operated by said shaft, means for rotating said container, and means for operating said shaft for causing periodic expansion of said mechanism.

4. A mechanism for use in chromium plating articles, comprising a container adapted to be immersed in a chromium solution and forming one terminal of an electrical circuit, a shaft in said container and insulated therefrom, said shaft providing the other terminal of said circuit, an expanding device carried by said shaft and including a rack and gear for the operation thereof, and means for alternately rotating said shaft in opposite directions for causing said device to be periodically expanded.

5. A mechanism for use in chromium plating articles, comprising a container adapted to be immersed in a chromium solution and forming one terminal of an electrical circuit, a shaft in said container and insulated therefrom, said shaft providing the other terminal of said circuit, an expanding device in said container and carried by said shaft and including a rack and gear for the operation thereof, and means exterior of said container for alternately rotating said shaft in opposite directions for causing said device to be periodically expanded.

6. A mechanism for use in chromium plating articles, comprising a container adapted to be immersed in a chromium solution and forming one terminal of an electrical circuit, means for rotating said container, a shaft in said container and insulated therefrom, said shaft providing the other terminal of said circuit, expanding mechanism carried by and operated by said shaft, means for rotating said container, and means for operating said shaft for causing periodic expansion of said mechanism.

7. A mechanism for use in chromium plating articles, comprising a container adapted to be immersed in a chromium solution and forming one terminal of an electrical circuit, means for rotating said container in one direction, a shaft in said container and insulated therefrom, said shaft providing the other terminal of said circuit, an expanding device carried by said shaft and including a rack and gear for the operation thereof, and means for alternately rotating said shaft in opposite directions for causing said device to be periodically expanded.

8. Mechanism for chromium plating articles including a container for said articles, and expanding means for causing engagement of said articles with said container.

9. Mechanism for chromium plating articles including a container for said articles, and alternately expanding and contracting means for causing periodic engagement of said articles with said container.

10. Mechanism for chromium plating articles including a container for said articles, and a plurality of overlapping plates for causing engagement of said articles with said container.

11. Mechanism for chromium plating articles including a container for said articles, and a plurality of overlapping plates each adapted to be alternately expanded and contracted for causing engagement of said articles with said container.

12. Mechanism for chromium plating articles including a container for said articles, a shaft in said container, mechanism for causing periodic engagement of said articles with said container, and means on said shaft for operating said mechanism.

13. Mechanism for chromium plating articles including a container for said articles, a shaft, a plurality of overlapping plates, and rack and gear mechanism on said shaft and plates for causing periodic engagement of said articles with said container.

14. Mechanism for chromium plating articles, including a container for said articles, a shaft in said container, said shaft being fluted to provide gear teeth, a plurality of overlapping plates, and a rack connected to said plates and operated by said gear teeth for causing periodic engagement of said articles with said container.

15. A tumbling barrel for use in chromium plating articles provided with expanding mechanism for impressing said articles against said barrel to form a contact therewith.

16. A tumbling barrel for use in chromium plating articles provided with expanding mechanism therein for forcing said articles into contacting engagement with said barrel.

17. A tumbling barrel for use in chromium plating articles provided with expanding mechanism for periodically forcing said articles into contacting engagement with said barrel.

In witness whereof, I hereunto subscribe my name to this specification.

CLYDE J. BRISTOW.